United States Patent
Hur et al.

(10) Patent No.: US 8,934,185 B2
(45) Date of Patent: Jan. 13, 2015

(54) STORAGE DEVICE HEAD INSTABILITY RECOVERY BY HEATING FROM HEAD HEATER

(71) Applicant: Seagate Technology LLC, Cupertino, CA (US)

(72) Inventors: Jung Wook Hur, Suwon (KR); Won Choul Yang, Kowloon Tong (HK); Haejung Lee, Suwon (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/725,054

(22) Filed: Dec. 21, 2012

(65) Prior Publication Data

US 2014/0177089 A1  Jun. 26, 2014

(51) Int. Cl.
*G11B 27/36* (2006.01)
*G11B 21/02* (2006.01)
*G11B 5/09* (2006.01)
*G11B 5/455* (2006.01)
*G11B 5/60* (2006.01)

(52) U.S. Cl.
CPC .............. *G11B 5/455* (2013.01); *G11B 5/607* (2013.01)

USPC .................. 360/31; 360/75; 360/53; 324/210

(58) Field of Classification Search
None
See application file for complete search history.

(56) References Cited

U.S. PATENT DOCUMENTS

| | | | |
|---|---|---|---|
| 5,461,526 A | 10/1995 | Hamakawa et al. | |
| 7,062,698 B2 | 6/2006 | Yang | |
| 7,420,760 B2 | 9/2008 | Zhang et al. | |
| 2003/0043489 A1 | 3/2003 | Lee et al. | |
| 2004/0240109 A1 | 12/2004 | Hamann et al. | |
| 2006/0268464 A1 | 11/2006 | Yang | |
| 2007/0188907 A1* | 8/2007 | Satoh et al. | 360/75 |
| 2008/0049351 A1* | 2/2008 | Yamanaka et al. | 360/59 |
| 2009/0296270 A1* | 12/2009 | Jin et al. | 360/97.02 |
| 2013/0294210 A1* | 11/2013 | Taratorin | 369/53.38 |

* cited by examiner

*Primary Examiner* — Andrew L Sniezek
(74) *Attorney, Agent, or Firm* — Taylor English Duma LLP

(57) ABSTRACT

Technologies are described herein for recovering an instable head in a storage device using an internal head heater. An instability in the reader head may be detected, and, in response to detecting the instability, a thermal shock may be applied to the reader head utilizing the head heater to recover the head.

20 Claims, 5 Drawing Sheets

STORAGE DEVICE HEAD INSTABILITY RECOVERY BY HEATING FROM HEAD HEATER

BRIEF SUMMARY

The present disclosure relates to technologies for recovering an instable head in a storage device, such as a hard-disk drive ("HDD") device, by applying a thermal shock, or otherwise increasing the heat for a duration of time, to the head using an internal head heater. According to some embodiments, a method of recovering the reader head comprises detecting an instability in the reader head and, in response to detecting the instability, applying a thermal shock to the reader head utilizing the internal head heater.

According to further embodiments, a computer-readable storage medium comprises processor-executable instructions that, when executed by a processor, cause the processor to detect an instability in a reader head of a storage device, and in response to detecting the instability in the reader head, cause a thermal shock to be applied to the reader head utilizing a head heater internal to the storage device. The processor may then determine whether the reader head was recovered by the application of the thermal shock, and if not, may cause the application of the thermal shock to the reader head to be repeated.

According to further embodiments, a system comprises a storage device comprising a reader head and a head heater, a processor operably connected to the storage device, and a memory operably connected to the processor and containing a thermal shock recovery module. The thermal shock recovery module may be configured to cause the processor to detect an instability in the reader head, and in response to detecting the instability in the reader head, apply a thermal shock to the reader head utilizing the head heater when the reader head is in an unload state.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for recovering an instable head in a storage device using a head heater. A typical storage device may include a hard-disk drive ("HDD") device. A magnetic reader head in the HDD may exhibit read instability, either in the burn-in ("B/I") process or during normal operation of the device. Instability in the reader head during the B/I process may cause increasing and/or fluctuating bit error rates ("BERs") and channel statistical measurements ("CSMs"). Fluctuating CSMs may result in the wrong CH RCO selection during the adaptive zone layout ("AZL") phase of the B/I process, while fluctuating BERs may result in the wrong BPI and/or TPI selection, potentially reducing the capacity of the HDD or causing the device to fail testing. Traditionally, heads presenting such instabilities may be screened-out in the B/I process, resulting in increased failure rates of heads and/or HDD devices during testing, thus increasing manufacturing costs. Further, instability in a reader head during normal operation of an HDD device, also referred to herein as "user condition," may result in decreased reliability and performance of the device and may eventually lead to device failure.

According to embodiments presented herein, reader head stability in an HDD or other storage device may be detected and the head recovered by applying a thermal shock to the reader head or thermally baking the head using an internal head heater. Utilizing the thermal shock recovery processes and methods described herein, a significant portion of the instable reader heads detected during the B/I process may be recovered without creating reliability issues, increasing the overall storage capacity of the storage devices and decreasing the number of components and/or devices that fail the B/I process. Further, heads that become instable in the user condition may also be recovered utilizing the described thermal shock recovery processes and methods, leading to improved performance and reliability of the HDD devices.

Figure 1:
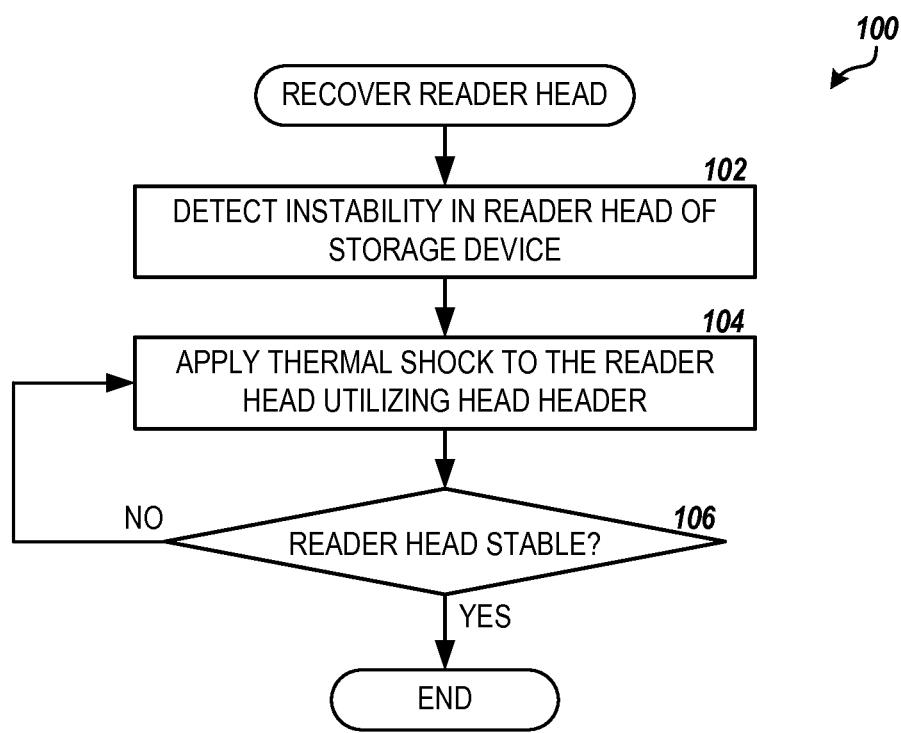
FIG. 1 is a flow diagram showing a method for recovering an instable head by applying a thermal shock, according to embodiments described herein.

FIG. 1 provides a high-level overview of the thermal shock recovery process, according to embodiments provided herein. Specifically, FIG. 1 illustrates one routine 100 for recovering an instable head in a storage device using a head heater. According to some embodiments, the routine 100 may be performed by a controller of the storage device. In other embodiments, the routine 100 may be performed by a computing system external to and operably connected to the storage device. The routine 100 begins at step 102, where an instability is detected in a reader head of the storage device. According to some embodiments, head instability may be detected by measuring CSMs or BERs from the reader head in the B/I process, by detecting base-line popping noise ("BLPN") or other process or signal noise from the reader head while in the unload state during normal operation, or by some other technique, as is described in more detail below. The CSM may represent a channel performance measurement indicating the number of broken bits read during a reading operation after a writing operation, while the BER may denote the rate of bit errors within a predetermined number of data bits contained in a signal read using the reader head. It will be appreciated that the BER may be indirectly obtained from the CSMs.

From step 102, the routine 100 proceeds to step 104, where a thermal shock is applied to the unstable reader head using a heater onboard the head of the storage device containing the unstable reader head. For example, the flying-on-demand ("FOD") heater of the head may be utilized to heat the reader head to a temperature for a duration such to stabilize the head, as will be described in more detail below. Heating the reader head may move the head to a lower energy state, stabilizing the materials of the reader head and restoring the head's performance. According to some embodiments, the routine 100 may proceed from step 104 to step 106, where the reader head is checked again to determine if it has been stabilized through the application of the thermal shock. If not, the thermal shock may be iteratively reapplied, at varying temperatures and/or durations, in order to recover the reader head. If the reader head is stable after application of the thermal shock(s), then the routine 100 ends. In some embodiments, these steps 104 and 106 may be implemented by utilizing a feedback loop designed to provide information regarding effectiveness and other parameters to the routine 100.

Figure 2:
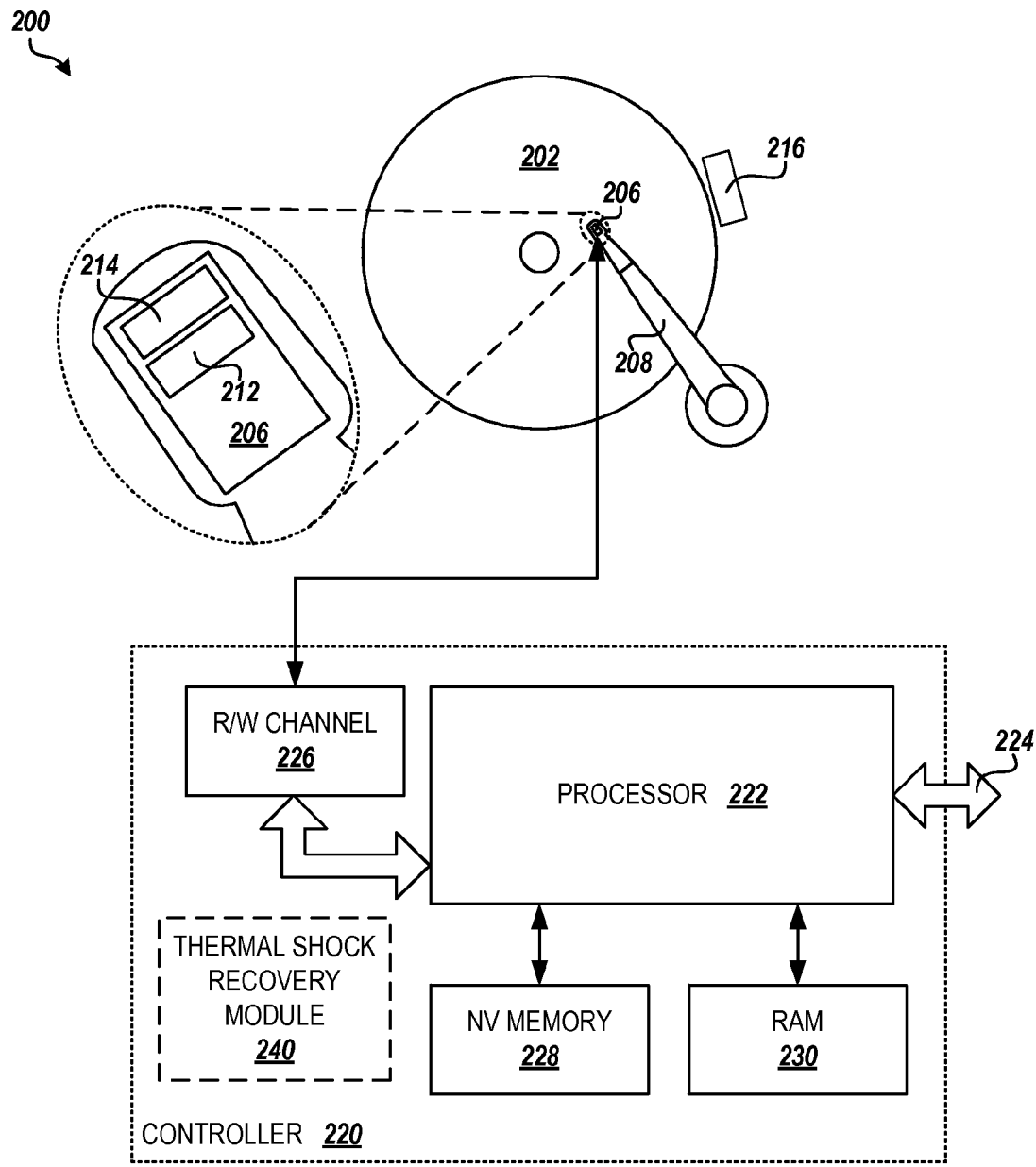
FIG. 2 is a block diagram showing an illustrative environment for recovering an instable head in a storage device using a head heater, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with several hardware, software, and components for recovering an instable head of the storage device 200, according to the embodiments provided herein. The storage device 200 may include magnetic media comprising at least one platter or disk 202. The storage device 200 further includes at least one read/write head 206 located adjacent to a surface of each disk 202. The read/write head 206 may read information from the disk 202 by sensing a magnetic field formed on portions of the surface of the disk, and may write information to the disk by magnetizing a portion of the surface of the disk. The read/write head 206 may be located at the distal end of an arm 208 that rotates in order to reposition the read/write head 206.

As further shown in the figure, the read/write head 206 may comprise multiple components. For example, the read/write head 206 may include a magneto-resistive ("MR") reader 212. According to embodiments, the read/write head 206 further includes a head heater 214. As described above, the head heater 214 may comprise a FOD heater that controls the flying height of the read/write head 206 over the surface of the disk 202, according to some embodiments. It will be appreciated that the size, location, and relative orientation of the head heater 214 and the reader 212 shown in FIG. 2 is for illustrative purposes only, and one of ordinary skill in the art will recognize that other sizes, locations, and relative orientations are possible and part of this disclosure. The read/write head 206 may include other components not shown in the figure or described herein, such as a separate writer and the like. In some embodiments, the reader 212 may be heated by a heat source external to the storage device 200 to stabilize the materials and/or demagnetize the reader head prior to and/or during assembly of the storage device.

The storage device 200 may further comprise a dock or ramp 216. The ramp 216 may provide a location for safely "parking" the read/write head 206 away from the surface of the disk 202 when not in use. In some embodiments, the ramp 216 may be located in other areas off the disk 202, such as at the inner off disk portion. Alternatively, in some embodiments, instead of an off disk ramp 216, an on disk landing zone located at either the inner or outer diameter of the disk 202 where no user data is stored may be utilized and be part of this disclosure.

The storage device 200 may further comprise a controller 220 that controls the operations of the storage device. The controller 220 may include a processor 222. The processor 222 may implement an interface 224 allowing the storage device 200 to communicate with a host device or other components, such as a server computer, personal computer ("PC"), laptop, tablet, game console, set-top box, or any other electronics device that can be communicatively coupled to the storage device 200 to store and retrieve data from the storage device.

The processor 222 may process write commands from the host device by formatting the associated data and transferring the formatted data via a read/write channel 226 through the read/write head 206 and to the surface of the disk 202. The processor 222 may further process read commands from the host device by determining the location of the desired data on the surface of the disk 202, moving the read/write head(s) 206 to the location (track) of the data, reading the data from the surface of the disk via the read/write channel 226, correcting any errors, and formatting the data for transfer to the host device.

The read/write channel 226 may convert data between the digital signals processed by the processor 222 and the analog signals conducted through the read/write head 206 for reading and writing data to the surface of the disk 202. The analog signals to and from the read/write head 206 may be further processed through a pre-amplifier circuit. The read/write channel 226 may further provide servo data read from the disk 202 to a VCM driver circuit for driving an actuator to position the read/write head 206. The read/write head 206 may be positioned at specific locations over the surface of the disk 202 for reading and writing data by moving the read/write head 206 radially across different tracks of the disk 202 using the actuator while the disk rotates.

The controller 220 may further include computer-readable media or "memory" for storing processor-executable instructions, data structures, and other information. The memory may comprise a non-volatile memory 228, such as read-only memory ("ROM") and/or FLASH memory, and a random-access memory ("RAM") 230, such as dynamic random access memory ("DRAM") or synchronous dynamic random access memory ("SDRAM"). For example, the non-volatile memory 228 and/or the RAM 230 may store a firmware that comprises commands and data necessary for performing the operations of the storage device 200. According to some embodiments, the non-volatile memory 228 and/or the RAM 230 may store processor-executable instructions that, when executed by the processor, perform the routines 100, 300, and 400 for recovering an instable head in the storage device 200 using the head heater 214, as described herein.

In addition to the non-volatile memory 228 and/or the RAM 230, the environment may include other computer-readable media storing program modules, data structures, and other data described herein for recovering an instable head of the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a thermal shock recovery module 240. The thermal shock recovery module 240 may perform the processes and methods described herein for recovering an instable head in the storage device 200 using the head heater 214. According to some embodiments, the thermal shock recovery module 240 may be implemented in the controller 220 as software, hardware, or any combination of the two. For example, the thermal shock recovery module 240 may be stored in the non-volatile memory 228 as part of the firmware of the storage device 200 and may be executed by the processor 222 for performing the recovery methods and routines described herein. The thermal shock recovery module 240 may be alternatively or additionally stored in the RAM 230 or other computer-readable media accessible by the controller 220.

In further embodiments, the thermal shock recovery module 240 may be implemented in a computing system external to and operably connected to storage device 200 such as to perform the recovery methods and routines described herein, as part of a testing of the storage device components by the manufacturer, for example. The thermal shock recovery module 240 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, read/write channel 226, non-volatile memory 228, RAM 230, and other components and circuitry of the storage device 200 may be integrated within a common integrated circuit package, or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2, or may utilize an architecture completely different than that shown in FIG. 2.

Figure 3A:
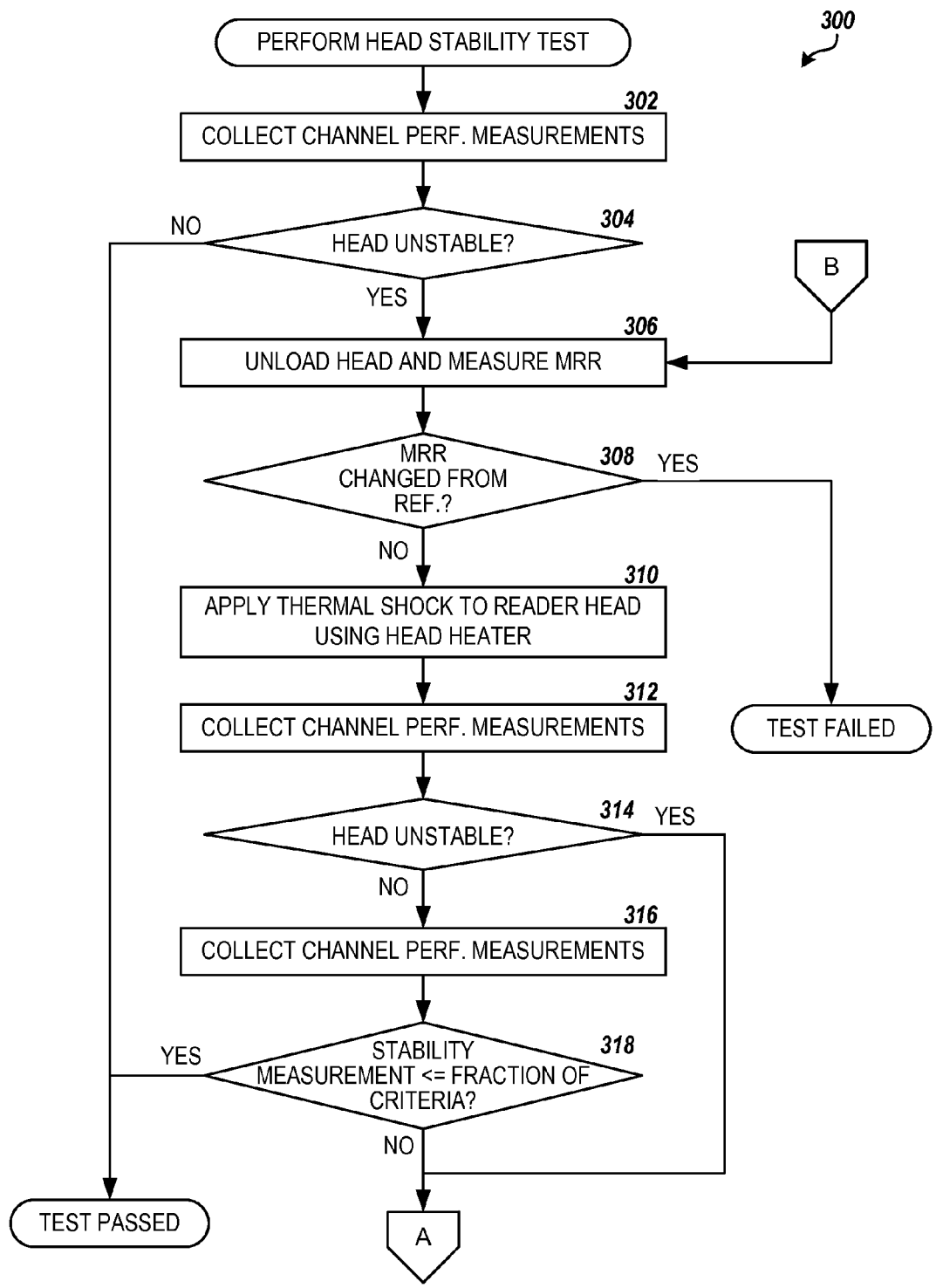
FIGS. 3A-3B are flow diagrams showing one routine for detecting and recovering an instable head during a burn-in ("B/I") process, according to embodiments described herein.
Figure 3B:
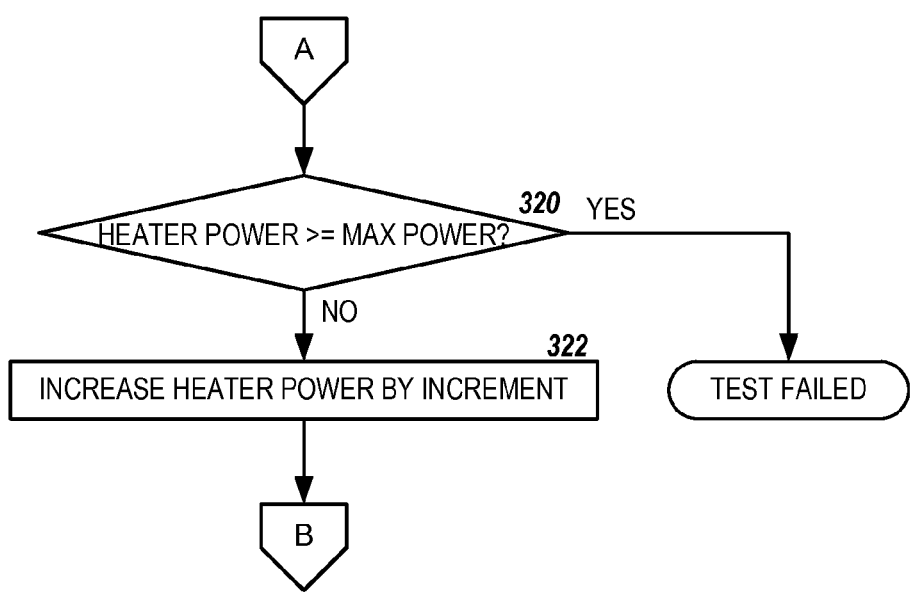

FIGS. 3A and 3B illustrate one routine 300 for performing a stability test of a reader 212 in a storage device 200 and recovering instable head(s) by applying a thermal shock using the head heater 214, according to some embodiments. The routine 300 may be utilized during the B/I process of the storage device 200 by the device manufacturer, for example. In addition, analogous routines may be utilized by a manufacturer of the reader 212 in testing the component before delivery to the manufacturer of the storage device 200. In some embodiments, the routine 300 may be performed by the thermal shock recovery module 240 described above in regard to FIG. 2. In further embodiments, the routine 300 may be performed by the controller 220 of the storage device 200, by external processors or computing systems performing the B/I or component testing process, or some other combination of modules, processors, and devices.

The routine 300 begins at step 302, as shown in FIG. 3A, where the thermal shock recovery module 240 collects channel performance/error measurements regarding the reader 212 of the storage device 200 to be utilized in detecting instability in the head. According to some embodiments, the channel performance measurements may comprise CSMs collected via the read/write channel 226 of the storage device 200. As described above, the CSMs may represent the number of broken bits read during a reading operation through the read/write channel 226. In other embodiments, the channel performance measurements may comprise BERs, SOVA error rates, BLPN or other process noise levels, or other measurements regarding the signal from the reader 212. In further embodiments, the thermal shock recovery module 240 may collect and/or aggregate a set of CSMs for use in determining the stability of the head. For example, 1000 CSMs may be collected by collecting CSMs at every B/I parameter monitoring step.

Next, the routine 300 proceeds to step 304, where the thermal shock recovery module 240 determines if the reader 212 is unstable. According to some embodiments, instability in the reader head may be indicated by fluctuations in the CSMs. The thermal shock recovery module 240 may calculate whether a standard deviation in deltas (or differences) between the collected CSMs exceeds some threshold value. For example, deltas may be calculated between CSMs 1-500 and CSMs 501-1000. The thermal shock recovery module 240 may then calculate the standard deviation in these delta values. If the standard deviation of the deltas exceeds the threshold value, then instability in the reader 212 may be indicated. The threshold value may be determined from successive tests of the B/I process on batches of storage devices. Higher threshold values, such as 2500, may result in fewer readers 212 being determined to be instable with a smaller chance of recovery of the instable heads. Lower threshold values, such as 1000, may result in more readers 212 being determined to be instable with an increased chance of applying a thermal shock to a normal head. However, the recovered readers 212 may exhibit higher capacity gains in AZL and may be more reliable in normal operation.

If, at step 304, instability in the reader head is not detected, then the reader head may be considered to have passed the stability testing, as indicated in FIG. 3A, and the routine 300 ends. If instability in the reader head is detected, then the routine 300 proceeds from step 304 to step 306, where the thermal shock recovery module 240 places the read/write head 206 containing the reader 212 in the unload state, e.g. parks the head in the ramp 216, and measures the resistance of the MR reader 212 ("MRR"). For the purposes of this disclosure "unload state" means positioning the head 206 in a location that is not over user or system data on the disk 202, including the off-disk ramp 216, an on-disk inner or outer radius landing zone, or other similar locations or schemes. This step may be performed to check if the reader 212 has been damaged by previous applications of thermal shock or other B/I or normal operation processes. If, at step 308, the MRR has changed some threshold amount, such as 10%, from a reference resistance for the reader 212, then the reader head may be considered to have failed stability testing, as indicated in FIG. 3A, and the routine 300 ends. It will be appreciated that the reference resistance for the reader 212 may represent a first resistance measurement for the head during the routine 300, or the reference resistance may be established for the reader 212 during some other phase of the B/I process or during manufacturing of the head or the storage device 200 and stored in a memory accessible to the thermal shock recovery module 240, such as the non-volatile memory 228 or the RAM 230 of the controller 220.

If, at step 308, the MRR has not changed the threshold amount from the reference resistance, then the routine 300 proceeds to step 310, where the thermal shock recovery module 240 applies a thermal shock to the reader 212 utilizing the head heater 214. According to some embodiments, the thermal shock may be applied by powering the head heater 214 at a specific power level for a specific duration while the read/write head 206 containing the reader head 112 head is in the unload state, i.e., parked in the ramp 216 or otherwise outside of the cooling effect of the spinning disk 202. Additionally, the thermal shock may be initially applied to the reader 212 at a low heat. For example, the head heater 214 may initially be powered to 20 mW for 100 seconds.

According to embodiments, the temperature of the head heater 214 may be raised by 2° C. for each 1 mW of power applied to the heater when the read/write head 206 is in the dock and outside of the cooling effect of the spinning disk

202. For example, an initial application of 20 mW for 100 seconds to the head heater 214 in order to thermally shock the reader 212 may be sufficient to recover approximately 20% of unstable reader heads without damaging the head. It will be appreciated that other power levels and durations may similarly be utilized to thermally shock the reader 212, and it is intended that all such power levels and durations be included in the scope of this disclosure.

From step 310, the routine 300 proceeds to step 312, where the thermal shock recovery module 240 collects a new set of channel performance measurements. According to some embodiments, the thermal shock recovery module 240 may collect a similar set of channel performance measurements as those collected at step 302. For example, another 1000 CSMs may be collected. The routine 300 then proceeds to step 314, where the thermal shock recovery module 240 determines if the stability of the reader 212 has been recovered by the application of the thermal shock. For example, the thermal shock recovery module 240 may calculate deltas between collected CSMs 1-500 and CSMs 501-1000 and determined the standard deviation in these delta values, as described above in regard to step 304. If the standard deviation of the deltas exceeds the threshold value, such as 2500, then reader 212 may still be unstable.

According to some embodiments, if instability in the reader 212 is no longer detected at step 314, then the routine 300 may proceed to step 316, where the thermal shock recovery module 240 collects another set of channel performance measurements, e.g., another 1000 CSMs. The routine 300 then proceeds to step 318, where the thermal shock recovery module 240 determines if the calculated stability measurement from the collected channel performance measurements for the reader 212 is less than or equal to some fraction, such as 90%, of the criteria value utilized to determine head stability above. For example, the thermal shock recovery module 240 may determine whether the standard deviation in the delta values of the newly collected CSMs is less than or equal to the fraction of the original threshold value, or 2250. This additional stability test of the reader 212 may be performed by the thermal shock recovery module 240 in order to ensure that the stability of the reader 212 has been fully recovered by the thermal shock process. If the calculated stability measurement for the reader 212 is less than or equal to the fraction of the criteria value after application of the thermal shock, then the reader head may be considered to have passed the stability testing, as indicated in FIG. 3A, and the routine 300 ends.

If instability in the reader 212 is still detected at step 314, or if it is determined that the stability of the reader head is not fully recovered at step 318, then the routine 300 proceeds to step 320, as shown in FIG. 3B. At step 320, the thermal shock recovery module 240 determines if the power level used by the head heater in the application of the last thermal shock to the reader 212 is equal to or exceeds a maximum power threshold. Because the application of excessive heat to the reader 212 may irreparably damage the reader 212, the thermal shock recovery module 240 may limit the power level applied to the head heater 214 in successive applications of thermal shocks to the reader head. For example, utilizing a maximum power threshold of 100 mW to the head heater 214 may prevent excessive damage to the reader 212 by limiting the temperature to which the reader head is heated. In some embodiments, the temperature realized at the reader 212 when the head heater 214 is powered to 100 mW is well below the Nèel temperature that could cause the reader head to be demagnetized.

At step 320, if the thermal shock recovery module 240 determines that the power level used by the head heater in the application of the last thermal shock to the reader 212 is equal to or exceeds the maximum power threshold, such as 100 mW, then the reader head may be considered to have failed the stability testing, as indicated in FIG. 3B, and the routine 300 ends. If the power level used in the last thermal shock to the reader 212 is less than the maximum power threshold, the routine 300 proceeds to step 322, where the power level for the next thermal shock is increased by some incremental value, such as 10 mW. The routine 300 then returns to step 306 shown in FIG. 3A, where the read/write head 206 containing the reader 212 is returned to an unload state, and the thermal shock recovery module 240 proceeds to apply a successive thermal shock to the reader head utilizing the new power level.

According to some embodiments, the thermal shock recovery module 240 may apply successive power levels between 20 mW and 100 mW to the head heater 214 to repeatedly thermally shock the reader 212 until the stability of the reader head is recovered. Utilizing successive power levels between 20 mW and 100 mW may recover a substantial percentage of unstable reader 212 in the B/I process without damaging the heads, providing increased capacity of the storage devices and ensuring long term reliability of the storage devices. In further embodiments, successive thermal shocks may use the same or lower power levels than previous thermal shocks, and the duration of the heating of the reader 212 may additionally or alternatively be varied in successive thermal shocks.

Figure 4:
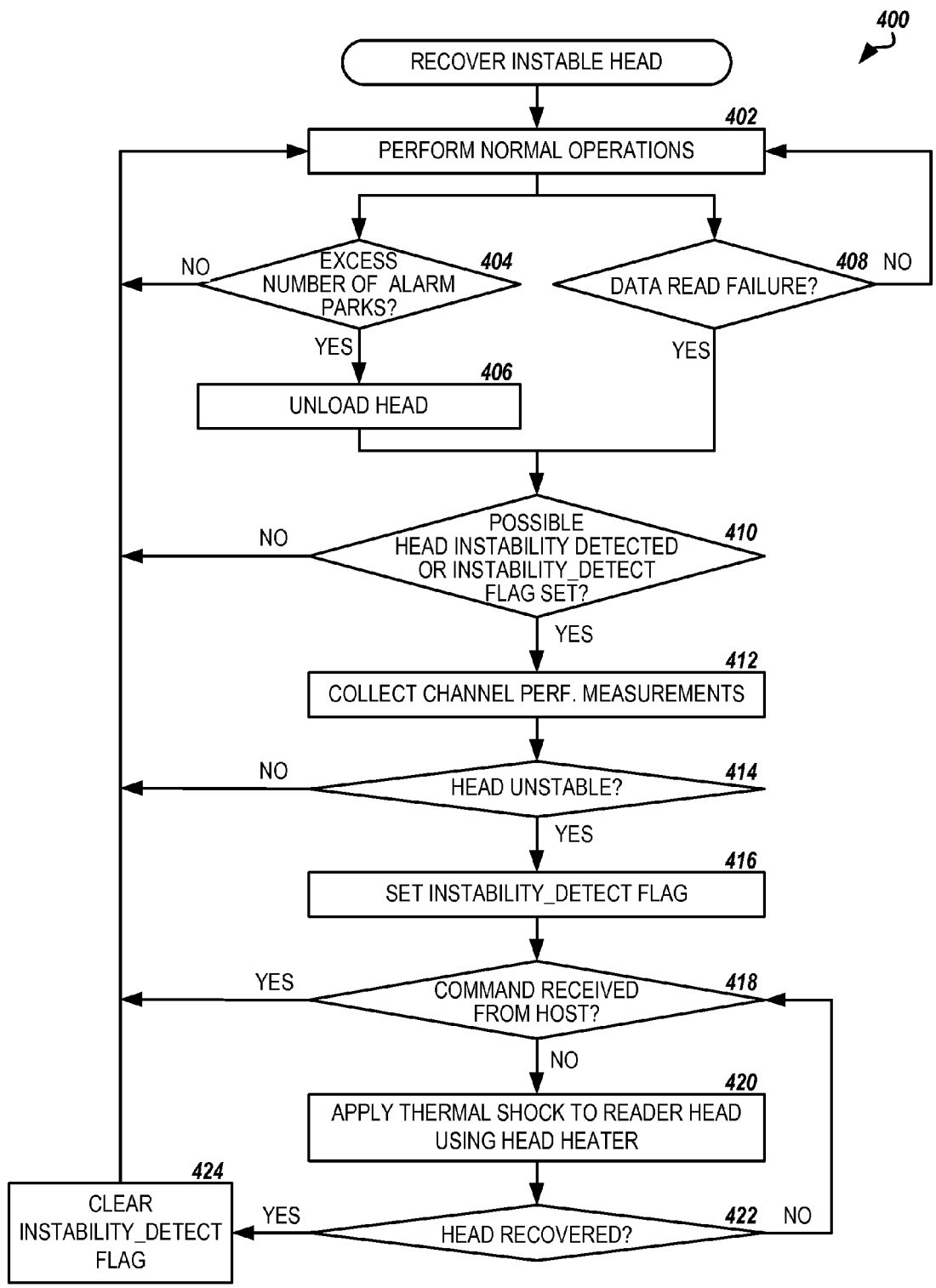
FIG. 4 is a flow diagram showing another routine for detecting and recovering an instable head during normal operation of a storage device, according to embodiments described herein.

FIG. 4 illustrates another routine 400 for detecting and recovering an instable reader 212 in a storage device 200 by applying a thermal shock using the head heater 214, according to further embodiments. The routine 400 may be utilized during the normal operation or user condition of the storage device 200, for example. In some embodiments, the routine 400 may be performed by the thermal shock recovery module 240 executing as part of the firmware on the controller 220 of the storage device 200, as described above in regard to FIG. 2. In further other embodiments, the routine 400 may be performed by external processors or computing systems operably connected to the storage device or by some other combination of modules, processors, and devices.

The routine 400 begins at step 402, where the storage device 200 performs normal operations in the user condition. During normal operations of the storage device 200, there may be a number of triggering conditions that occur that may cause the thermal shock recovery module 240 to initiate a thermal shock recovery process of a reader 212. According to some embodiments, if the thermal shock recovery module 240 detects that a reader 212 has had a number of "alarm parks" exceeding some threshold value, as shown at 404 in FIG. 3, then the routine 400 may proceed to step 406, where the head is unloaded, e.g., parked in the dock, and then to step 410, where the thermal shock recovery module 240 may initiate the thermal shock recovery process of the reader 212.

In further embodiments, if the thermal shock recovery module 240 detects that the storage device 200 has experienced excessive read failure rates or a final data read failure, as shown at 408 in FIG. 3, then the routine 400 may proceed to step 410, where the thermal shock recovery module 240 may initiate the thermal shock recovery process for the reader 212 involved in the data read failure. It will be appreciated that there may be any number of alarms, errors, failures, or other triggering conditions of the storage device 200 that may cause the thermal shock recovery module 240 to initiate a thermal shock recovery process of a reader 212 during normal operation of the storage device beyond those described herein and shown in FIG. 4.

At step 410, the thermal shock recovery module 240 determines whether possible reader head instability exists based on the triggering condition of the storage device 200 that initiated the thermal shock recovery process. For example, the thermal shock recovery module 240 may determine a possibility of reader head instability exists if the retry count history of recent read operations through the reader 212 exceeds some threshold value. In some embodiments, the thermal shock recovery module 240 may also check whether an INSTABILITY_DETECT flag is currently set, as will be described in more detail below in regard to step 416. If at step 406 the thermal shock recovery module 240 does not detect possible reader head instability and the INSTABILITY_DETECT flag is not set, the routine 400 returns to step 402 where the storage device 200 continues to perform normal operations.

If the thermal shock recovery module 240 detects possible reader head instability or the INSTABILITY_DETECT detect flag is set, then the routine 400 proceeds from step 410 to step 412, where the thermal shock recovery module 240 collects channel performance measurements regarding the reader 212 of the storage device 200 to be utilized in detecting instability in the head. According to some embodiments, the channel performance measurements may comprise measurements of BLPN via the read/write channel 226 while the read/write head 206 is in the unload state, also referred to herein as "spike noise." In other embodiments, the channel performance measurements may comprise measurements of process noise in the read/write channel 226 with the read/write head 206 is in the load state. In further embodiments, the channel performance measurements may comprise BERs, SOVA error rates, or other measurements regarding the signal from the reader 212.

Next, the routine 400 proceeds from step 412 to step 414, where the thermal shock recovery module 240 determines if the reader 212 is unstable. According to some embodiments, instability in the reader 212 may be detected by determining that spike noise exists or that process noise levels exceeds some threshold value. The threshold value for process noise levels may be set during a calibration step of the B/I process, for example. According to some embodiments, the threshold value is the B/I process calibration value+1. If instability in the reader head is not detected, e.g., no spike noise is detected, then the routine 400 returns to step 402 where the storage device 200 continues to perform normal operations.

According to some embodiments, if instability in the reader head is detected, e.g., spike noise is detected, then the routine 400 proceeds from step 414 to step 416, where the thermal shock recovery module 240 sets the INSTABILITY_DETECT flag. The INSTABILITY_DETECT flag may be utilized to signal the thermal shock recovery module 240 to perform the reader stability detection and application of thermal shock the next time a triggering condition in the storage device 200 occurs if the routine 400 is interrupted by a command from a host device connected to the storage device, for example. Next, the routine 400 proceeds to step 418, where the thermal shock recovery module 240 checks to see whether a pending command for the storage device 200 has been received from a connected host device. If a command from the host device has been received, then the routine 400 returns to step 402 where the storage device 200 performs normal operations, including processing the pending command from the connected host device.

If no command has been received from the connected host device, then the routine 400 proceeds from step 418 to step 420, where the thermal shock recovery module 240 applies a thermal shock to the reader 212 utilizing the head heater 214.

According to some embodiments, the thermal shock may be applied by powering the head heater 214 at a specific power level for a specific duration, as described above in regard to FIGS. 3A and 3B. From step 420, the routine 400 proceeds to step 422, where the thermal shock recovery module 240 determines if the stability of the reader 212 was recovered by application of the thermal shock. For example, the thermal shock recovery module 240 may determine whether spike noise still exists in the read/write channel 226 while the read/write head 206 is in the unload state or that the BLPN and/or other process noise level still exceeds the threshold value.

If, at step 422, the thermal shock recovery module 240 determines that the reader 212 was not been recovered by the thermal shock, then the routine 400 returns to step 418, where the thermal shock recovery module 240 checks to see whether a pending command for the storage device 200 has been received from the connected host device, and if not, proceeds to apply another thermal shock to the reader 212 utilizing the head heater 214. According to some embodiments, the thermal shock recovery module 240 may apply successive thermal shocks to the reader 212 with increasing power levels and/or durations until the head is recovered or until some maximum power level is reached, as further described above in regard to FIGS. 3A and 3B. If the thermal shock recovery module 240 determines that the reader 212 was recovered by the application of the thermal shock(s), then the routine 400 proceeds from step 422 to step 424, where the thermal shock recovery module 240 clears the INSTABILITY_DETECT flag. Next, the routine 400 returns to step 402 where the storage device 200 resumes performing normal operations.

It will be appreciated that the embodiments described herein may also be utilized to detect instability and recover magnetic reader heads of an HDD or other storage device beyond the MR reader 212 described herein. While embodiments are described herein in regard to an HDD device, it will be appreciated that the embodiments described herein may be utilized to recover an instable head in any storage device containing a magnetic reader head, including but not limited to, a magnetic tape drive. Further, the embodiments described herein may be utilized to detect instability and recover other magnetic heads of an HDD or other storage device beyond the reader head, such as a writer head of the HDD.

Based on the foregoing, it will be appreciated that technologies for recovering an instable head in a storage device using an internal head heater are presented herein. The above-described embodiments are merely possible examples of implementations, merely set forth for a clear understanding of the principles of the present disclosure. The logical operations, functions, or steps described herein as part of a method, process, or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions, or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   detecting, by a controller in a storage device, an instability in a reader head of the storage device; and
   in response to detecting the instability in the reader head, applying, by the controller, a thermal shock to the reader head utilizing a head heater, the thermal shock thermally baking the reader head to lower the energy state of the reader head.

2. The method of claim 1, further comprising steps of:
   determining, by the controller, whether the reader head is stable; and
   in response to determining the reader head is not stable, repeating, by the controller and via a feedback loop, the application of the thermal shock to the reader head.

3. The method of claim 2, wherein a successive application of the thermal shock utilizes a higher power level of the head heater than a previous application of the thermal shock.

4. The method of claim 1, wherein detecting the instability comprises measuring noise in the reader head in an unload state of the reader head and determining that the noise exceeds a threshold value.

5. The method of claim 1, wherein the instability in the reader head is detected during one of a burn-in process or a user condition of the storage device.

6. The method of claim 1, wherein the thermal shock applies power levels between 20 mW and 100 mW.

7. The method of claim 1, wherein the thermal shock is applied to the reader head utilizing the head heater when the reader head is in an unload state.

8. The method of claim 1, wherein the reader head has been heated by an external heat source during assembly of the storage device.

9. The method of claim 1, wherein the head heater comprises a flying-on-demand heater.

10. A method comprising steps of:
    detecting, by a controller in a storage device, an instability in a reader head of the storage device by collecting a plurality of channel statistical measurements and determining that a standard deviation in deltas between the plurality of channel statistical measurements exceeds a threshold value; and
    in response to detecting the instability in the reader head, applying, by the controller, a thermal shock to the reader head utilizing a head heater.

11. A non-transitory computer-readable storage medium having processor-executable instructions stored thereon that, when executed by a processor, cause the processor to:
    detect an instability in a head of a storage device;
    in response to detecting the instability in the head, utilize a heater internal to the storage device to apply a thermal shock to the head to stabilize the head, the thermal shock thermally baking the head to lower the energy state of the head;
    determine whether the head is recovered; and
    in response to determining the head is not recovered, cause the application of the thermal shock to the head to be repeated.

12. The computer-readable storage medium of claim 11, wherein a successive application of the thermal shock utilizes a higher power level of the heater.

13. The computer-readable storage medium of claim 11, wherein detecting the instability in the head comprises detecting fluctuation in channel statistical measurements regarding the head.

14. The computer-readable storage medium of claim 11, wherein detecting the instability in the head comprises detecting process noise in the head in an unload state of the head.

15. The computer-readable storage medium of claim 11, wherein the thermal shock is applied to the head utilizing the heater when the head is in an unload state.

16. A system comprising:
    a storage device comprising a reader head and a head heater;
    a processor operably connected to the storage device; and
    a thermal shock recovery module operably connected to the processor and configured to cause the processor to
    detect an instability in the reader head, and
    in response to detecting the instability in the reader head, cause a thermal shock to be applied to the reader head utilizing the head heater when the reader head is in an unload state, the thermal shock thermally baking the reader head to lower the energy state of the reader head.

17. The system of claim 16, wherein the thermal shock recovery module is further configured to cause the processor to:
    in response to applying the thermal shock, determine whether the reader head is stable; and
    in response to determining the reader head is not stable, cause the application of the thermal shock to the reader head to be repeated at a higher power level of the head heater.

18. The system of claim 16, wherein the instability in the reader head is detected during a burn-in process of the storage device.

19. The system of claim 16, wherein the instability in the reader head is detected while the storage device is in use.

20. The system of claim 16, wherein the storage device further comprises the processor and a memory operably connected to the processor and containing the thermal shock recovery module.

* * * * *